US008484125B1

(12) United States Patent
Hustad et al.

(10) Patent No.: US 8,484,125 B1
(45) Date of Patent: *Jul. 9, 2013

(54) MARKET PARTICIPANT ISSUE SELECTION SYSTEM AND METHOD

(75) Inventors: Daniel R. Hustad, Glen Ellyn, IL (US); Larry Pfaffenbach, Roselle, IL (US); John E. Smollen, Chicago, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,541

(22) Filed: Jun. 25, 2012

Related U.S. Application Data

(63) Continuation of application No. 12/836,349, filed on Jul. 14, 2010, now Pat. No. 8,209,255, which is a continuation of application No. 11/102,490, filed on Apr. 7, 2005, now Pat. No. 7,809,629.

(51) Int. Cl.
*G06Q 40/00* (2012.01)
(52) U.S. Cl.
USPC .......................................................... 705/37
(58) Field of Classification Search
CPC ................................................... G06Q 40/04
USPC ............................................................ 705/37
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,903,201 A | 2/1990 | Wagner | |
| 4,980,826 A | 12/1990 | Wagner | |
| 5,038,284 A | 8/1991 | Kramer | |
| 5,101,353 A | 3/1992 | Lupien et al. | |

(Continued)

FOREIGN PATENT DOCUMENTS

| | | |
|---|---|---|
| EP | 0 752 135 B1 | 2/1999 |
| EP | 0 952 536 A1 | 10/1999 |

(Continued)

OTHER PUBLICATIONS

"NYSE Votes to Restrict Computerized Trading", San Jose Mercury News, Feb. 5, 1988.

(Continued)

*Primary Examiner* — Eric T Wong
(74) *Attorney, Agent, or Firm* — Brinks Hofer Gilson & Lione

(57) ABSTRACT

A system and method of allocating rights for quoting issues on a trading facility such as an exchange is described. The method may include providing market participants such as remote market makers with a listing of issues available for remote quote streaming where the available issues are ranked according to predetermined trading parameters. A market participant requests allocations of rights to certain issues and the request is filtered according to a value associated with the ranking of the selected issues. The system includes an issue selection database having a listing of issues available for trading where each issue is ranked based on a trading parameter. An issue selection communication module communicates with the issue selection database and is configured to list available issues and rankings. An issue allocation filter receives a market participant request and compares the selected issues in that request to one or more exchange-based rules.

20 Claims, 4 Drawing Sheets

U.S. PATENT DOCUMENTS

| | | |
|---|---|---|
| 5,136,501 A | 8/1992 | Silverman et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,315,634 A | 5/1994 | Tanaka et al. |
| 5,557,517 A | 9/1996 | Daughterty, III |
| 5,664,115 A | 9/1997 | Fraser |
| 5,689,652 A | 11/1997 | Lupien et al. |
| 5,715,402 A | 2/1998 | Popolo |
| 5,744,877 A | 4/1998 | Owens |
| 5,774,877 A | 6/1998 | Patterson, Jr. et al. |
| 5,787,402 A | 7/1998 | Potter et al. |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,813,009 A | 9/1998 | Johnson et al. |
| 5,819,237 A | 10/1998 | Garman |
| 5,845,266 A | 12/1998 | Lupien et al. |
| 5,873,071 A | 2/1999 | Ferstenberg et al. |
| 5,905,974 A | 5/1999 | Fraser et al. |
| 5,913,202 A | 6/1999 | Motoyama |
| 5,915,209 A | 6/1999 | Lawrence |
| 5,915,245 A | 6/1999 | Patterson, Jr. et al. |
| 5,924,082 A | 7/1999 | Silverman et al. |
| 5,950,176 A | 9/1999 | Keiser et al. |
| 5,950,177 A | 9/1999 | Lupien et al. |
| 5,963,923 A | 10/1999 | Garber |
| 5,970,479 A | 10/1999 | Spepherd |
| 5,978,779 A | 11/1999 | Stein et al. |
| 6,012,046 A | 1/2000 | Lupien et al. |
| 6,014,627 A | 1/2000 | Togher et al. |
| 6,014,643 A | 1/2000 | Minton |
| 6,016,483 A | 1/2000 | Rickard et al. |
| 6,018,722 A | 1/2000 | Ray et al. |
| 6,021,397 A | 2/2000 | Jones et al. |
| 6,035,288 A | 3/2000 | Solomon |
| 6,076,068 A | 6/2000 | DeLapa et al. |
| 6,119,103 A | 9/2000 | Basch et al. |
| 6,195,647 B1 | 2/2001 | Martyn et al. |
| 6,199,050 B1 | 3/2001 | Alaia et al. |
| 6,230,146 B1 | 5/2001 | Alaia et al. |
| 6,247,000 B1 | 6/2001 | Hawkins et al. |
| 6,263,321 B1 | 7/2001 | Daughtery, III |
| 6,266,651 B1 | 7/2001 | Woolston |
| 6,269,346 B1 | 7/2001 | Cristofich et al. |
| 6,272,474 B1 | 8/2001 | Garcia |
| 6,278,982 B1 | 8/2001 | Korhammer et al. |
| 6,282,521 B1 | 8/2001 | Howorka |
| 6,285,989 B1 | 9/2001 | Shoham |
| 6,317,727 B1 | 11/2001 | May |
| 6,317,728 B1 | 11/2001 | Kane |
| 6,321,212 B1 | 11/2001 | Lange |
| 6,377,940 B2 | 4/2002 | Tilfors et al. |
| 6,405,180 B2 | 6/2002 | Tilfors et al. |
| 6,421,653 B1 | 7/2002 | May |
| 6,493,682 B1 | 12/2002 | Horrigan et al. |
| 6,505,174 B1 | 1/2003 | Keiser et al. |
| 6,505,175 B1 | 1/2003 | Silverman et al. |
| 6,539,362 B1 | 3/2003 | Patterson, Jr. et al. |
| 6,560,580 B1 | 5/2003 | Fraser et al. |
| 6,564,192 B1 | 5/2003 | Kinney, Jr. et al. |
| 6,601,627 B2 | 8/2003 | Kasai et al. |
| 6,618,707 B1 | 9/2003 | Gary |
| 6,647,374 B2 | 11/2003 | Kansal |
| 7,039,610 B2 | 5/2006 | Morano et al. |
| 7,047,218 B1 | 5/2006 | Wallman |
| 7,085,738 B2 | 8/2006 | Tarrant |
| 7,099,839 B2 | 8/2006 | Madoff et al. |
| 7,225,153 B2 | 5/2007 | Lange |
| 7,233,922 B2 | 6/2007 | Asher et al. |
| 7,246,093 B1 * | 7/2007 | Katz .................... 705/37 |
| 7,260,554 B2 | 8/2007 | Morano et al. |
| 7,296,025 B2 | 11/2007 | Kung et al. |
| 7,333,950 B2 | 2/2008 | Shidler et al. |
| 7,389,264 B2 | 6/2008 | Kemp, II et al. |
| 2002/0002530 A1 | 1/2002 | May |
| 2002/0013760 A1 | 1/2002 | Arora et al. |
| 2002/0019799 A1 | 2/2002 | Ginsberg et al. |
| 2002/0032629 A1 | 3/2002 | Siegel, Jr. et al. |
| 2002/0052816 A1 | 5/2002 | Clenaghan et al. |
| 2002/0082967 A1 | 6/2002 | Kaminsky et al. |
| 2002/0087365 A1 | 7/2002 | Kavanaugh |
| 2002/0099640 A1 | 7/2002 | Lange |
| 2002/0103738 A1 | 8/2002 | Griebel et al. |
| 2002/0128952 A1 | 9/2002 | Melkomian et al. |
| 2002/0138401 A1 | 9/2002 | Allen et al. |
| 2002/0147670 A1 | 10/2002 | Lange |
| 2002/0152152 A1 | 10/2002 | Abdelnur et al. |
| 2002/0156716 A1 | 10/2002 | Adatia |
| 2002/0156718 A1 | 10/2002 | Olsen et al. |
| 2002/0198813 A1 | 12/2002 | Patterson, Jr. et al. |
| 2003/0004858 A1 | 1/2003 | Schmitz |
| 2003/0009411 A1 | 1/2003 | Ram et al. |
| 2003/0018567 A1 | 1/2003 | Flitcroft et al. |
| 2003/0018569 A1 | 1/2003 | Eisenthal et al. |
| 2003/0028462 A1 | 2/2003 | Fuhrman et al. |
| 2003/0028468 A1 | 2/2003 | Wong et al. |
| 2003/0093352 A1 | 5/2003 | Muralidhar et al. |
| 2003/0097319 A1 | 5/2003 | Moldovan et al. |
| 2003/0097325 A1 | 5/2003 | Friesen et al. |
| 2003/0115128 A1 | 6/2003 | Lange et al. |
| 2003/0139998 A1 | 7/2003 | Gilbert et al. |
| 2003/0167175 A1 | 9/2003 | Salom |
| 2003/0177077 A1 | 9/2003 | Norman |
| 2003/0182220 A1 | 9/2003 | Galant |
| 2003/0208430 A1 | 11/2003 | Gershon |
| 2003/0220865 A1 | 11/2003 | Lutnick |
| 2003/0225657 A1 | 12/2003 | Whaley et al. |
| 2003/0225658 A1 | 12/2003 | Whaley |
| 2003/0236738 A1 | 12/2003 | Lange et al. |
| 2004/0019554 A1 | 1/2004 | Merold et al. |
| 2004/0024681 A1 | 2/2004 | Moore et al. |
| 2004/0030630 A1 | 2/2004 | Tilfors et al. |
| 2004/0088242 A1 | 5/2004 | Ascher et al. |
| 2004/0103050 A1 | 5/2004 | Long |
| 2004/0111358 A1 | 6/2004 | Lange et al. |
| 2004/0117284 A1 | 6/2004 | Speth |
| 2004/0133439 A1 | 7/2004 | Noetzold et al. |
| 2004/0158520 A1 | 8/2004 | Noh |
| 2004/0199450 A1 | 10/2004 | Johnston et al. |
| 2004/0215538 A1 | 10/2004 | Smith |
| 2004/0236636 A1 | 11/2004 | Lutnick et al. |
| 2004/0267657 A1 | 12/2004 | Hecht |
| 2005/0027643 A1 | 2/2005 | Amaitis et al. |
| 2005/0044019 A1 | 2/2005 | Novick et al. |
| 2005/0049948 A1 | 3/2005 | Fuscone |
| 2005/0097027 A1 | 5/2005 | Kavanaugh |
| 2005/0125326 A1 | 6/2005 | Nangalia et al. |
| 2005/0144104 A1 | 6/2005 | Kastel |
| 2005/0149428 A1 | 7/2005 | Gooch et al. |
| 2005/0165669 A1 | 7/2005 | Montanaro et al. |
| 2005/0209945 A1 | 9/2005 | Ballow et al. |
| 2005/0216384 A1 | 9/2005 | Partlow et al. |
| 2005/0267833 A1 | 12/2005 | Brodersen et al. |
| 2006/0008016 A1 | 1/2006 | Balakrishnan et al. |
| 2006/0036531 A1 | 2/2006 | Jackson et al. |
| 2006/0069636 A1 * | 3/2006 | Griffin et al. .................... 705/37 |
| 2006/0100949 A1 | 5/2006 | Whaley et al. |
| 2006/0106700 A1 | 5/2006 | Boren et al. |
| 2006/0106713 A1 | 5/2006 | Tilly et al. |
| 2006/0143099 A1 | 6/2006 | Partlow et al. |
| 2006/0149659 A1 | 7/2006 | Carone et al. |
| 2006/0167788 A1 | 7/2006 | Tilly et al. |
| 2006/0167789 A1 | 7/2006 | Tilly et al. |
| 2006/0253354 A1 | 11/2006 | O'Callahan |
| 2006/0253355 A1 | 11/2006 | Shalen |
| 2006/0253359 A1 | 11/2006 | O'Callahan |
| 2006/0253367 A1 | 11/2006 | O'Callahan et al. |
| 2006/0253368 A1 | 11/2006 | O'Callahan et al. |
| 2006/0253369 A1 | 11/2006 | O'Callahan |
| 2006/0253370 A1 | 11/2006 | Feuser et al. |
| 2007/0011081 A1 | 1/2007 | Bok et al. |
| 2007/0078740 A1 | 4/2007 | Landle et al. |
| 2007/0106585 A1 | 5/2007 | Miller |
| 2007/0112659 A1 | 5/2007 | Shalen et al. |
| 2007/0172026 A1 | 7/2007 | Schlomka et al. |
| 2007/0172352 A1 | 7/2007 | Chiang |

| | | | |
|---|---|---|---|
| 2007/0282758 | A1 | 12/2007 | Vischer et al. |
| 2008/0059356 | A1 | 3/2008 | Brodsky et al. |
| 2008/0065560 | A1 | 3/2008 | Bloom |
| 2008/0120249 | A1 | 5/2008 | Hiatt |
| 2008/0120250 | A1 | 5/2008 | Hiatt, Jr. |
| 2008/0154790 | A1 | 6/2008 | Hiatt |
| 2008/0183640 | A1 | 7/2008 | Shalen |
| 2008/0243676 | A1 | 10/2008 | Smith |
| 2012/0158567 | A1* | 6/2012 | Carone et al. .................. 705/37 |

FOREIGN PATENT DOCUMENTS

| | | |
|---|---|---|
| WO | 00/28449 | 5/2000 |
| WO | 00/48053 | 8/2000 |
| WO | 00/57307 A1 | 9/2000 |
| WO | 00/70506 | 11/2000 |
| WO | 01/22263 | 3/2001 |
| WO | 01/22269 | 3/2001 |
| WO | 01/22313 | 3/2001 |
| WO | 01/22315 | 3/2001 |
| WO | 01/22332 | 3/2001 |
| WO | 01/88808 | 11/2001 |
| WO | 02/37396 A2 | 5/2002 |
| WO | 02/077766 A1 | 10/2002 |

OTHER PUBLICATIONS

"PHLX Files Rule Changes to Improve Handling Orders on Pace", Securities Week, p. 5, Jul. 17, 1989.

smartRay.com Delivers Stock Quotes and Financial Information to Wireless Devices for Freer, PR Newswire, p. 2870, Dec. 16, 1999.

"Self-Regulatory Organizations; Notice of Filing of Proposed Rule Change and Amendment No. 1 Thereto by the Pacific Exchange, Inc. Relating to the Exchange's New Trading Platform for Options, PCX Plus", 67 Fed. Reg. 69,580-69, 592 (Nov. 18, 2002).

"The Electronic Component", The Options Institute Online Learning Center, obtained at the internet address: http://www.cboe.com/LearnCenter/cboeeducation/Course_02_02/mod_02_03.html, dated 2003.

"The Pandora's Box over autoquotes; Industry Trend or Event", Wall Street & Technology, Section No. 3, vol. 13, p. 38; ISSN: 1060-989X, Mar. 1997.

Amendment No. 2 to SR-CBOE-2002-05, Submitted to SEC on May 16, 2002, 21 pages.

Amendment No. 3 to SR-CBOE-2002-05, Submitted to SEC on Jan. 15, 2003, 69 pages.

Amendment No. 4 to SR-CBOE-2002-05, Submitted to SEC on Apr. 3, 2003, 71 pages.

Amendment No. 5 to SR-CBOE-2002-05, Submitted to SEC on May 15, 2003, 3 pages.

Amendment No. 6 to SR-CBOE-2002-05, Submitted to SEC on May 30, 2003, 28 pages.

Angel, James J., "How Best to Supply Liquidity to a Small-Capitalization Securities Market", Georgetown University, Jul. 15, 1996, 27 pages.

Blahnik, Mike, "Internet Opens Up Trading Frontiers", Star Tribune, Metro Edition, Minneapolis, MN, Retrieved from: http://web.archive.org/web/20040322223904/http://www.trade.com/, dated Jul. 25, 2004.

Bogomolny, Laura,: Wanna Make a Bet?, Canadian Business, Toronto, vol. 77, Iss. 21, Oct. 25 to Nov. 7, 2004.

Bounds for a Volume Weighted Average Price Option, A. W. Stace, Sep. 24, 2004.

CBOE Futures Exchange letter dated May 17, 2004, to Commodity Futures Trading Commission with accompanying pages containing rules, terms, and conditions for a new product to be traded on the CBOE Futures Exchange, 8 pages.

CBOE Information Circular IC 93-88 (Nov. 18, 1993).

CBOE Rules, CCH (1989) (Rules 6.45-8.80).

Chicago Board of Options Exchange, Inc. Description of the CBOE S & P 500 BuyWrite Index (BXM$^{SM}$), 5 pages, 2004.

Chicago Board of Options Exchange, Inc. The New CBOE Volatility Index, 19 pages, 2003.

Co-Pending U.S. Appl. No. 60/986,727, filed Nov. 9, 2007.

U.S. Appl. No. 09/699,533 filed Oct. 30, 2000 entitled "Automated Trading Exchange System and Method Utilizing Randomized Opening Procedures".

Demeterfi, Kresimir, et al., "More Than You Ever Wanted to Know About Volatility Swaps," Goldman Sachs Quantitative Strategies Research Notes, Mar. 1999.

Duffie, D. and Huang, M., "Swap Rates and Credit Quality", Mar. 31, 1995.

E. Clemons et al., "Information Technology and Screen-Based Securities Trading: Pricing the Stock and Pricing the Trade", Management Science, vol. 43, No. 12, Dec. 1997.

Glen, Jack D., "Trading and information systems in two emerging stock markets", East Asian Executive Reports, vol. 16 No. 12, pp. 8, 14, Dec. 15, 1994.

Hull, J. and White, A., "The Valuation of Credit Default Swap Options", Journal of Derivatives, vol. 10, No. 3, 2003, p. 40.

Michaels, Jenna, "NASD'S Global Fumble", All Street & Technology, vol. 9 No. 11, pp: 57-62, Jul. 1992.

Morgan Stanley, "Global Medium-Term Notes, series F", Registration statement No. 333-117752, Securities Commission and Exchange, 2004, pp. 22-26.

NASD Notice 00-65, Sep. 2000, 5 pages.

Original Rule Filing and Amendment No. 1 to SR-CBOE-2002-05, Submitted to SEC on Jan. 16, 2002, 17 pages.

PCX Plus The Pacific Exchange, PCX Plus Overview, Oct. 9, 2003, six pages.

Press Release article, "CBOE Announces Launch of Futures on VIX: First Tradable Volatility Product Will be Offered on New CBOE Futures Exchange," Sep. 5, 2003, two pages.

Raithel, Tom, article titled "Major Changes Seen for Exchanges", Evansville Courier and Press, Apr. 12, 2000, p. B.6.

SEC Notice, Release No. 34-39086, SR-PCX-97-18, Federal Register vol. 62, No. 185, dated Wednesday, Sep. 24, 1997, pp. 50036-50048.

SEC Notice, Release No. 34-46803, SR-PCX-2002-36, Federal Register vol. 67 No. 222, dated Monday, Nov. 18, 2002, pp. 69580-69592.

SEC Notice, Release No. 34-47676, SR-CBOE-2002-05, Federal Register vol. 68 No. 77, dated Tuesday, Apr. 22, 2003, pp. 19865-19874.

SEC Notice, Release No. 34-47959, SR-CBOE-2002-05, Federal Register vol. 68, No. 110, dated Monday, Jun. 9, 2003, pp. 34441-34448.

SEC Notice, Release No. 34-51107, SR-CBOE-2004-75, Federal Register vol. 70, No. 23, dated Friday, Feb. 4, 2005, pp. 6051-6057.

Self-Regulatory Organization; Chicago Stock Exchange, Inc.; Order Approving Proposed Rule Change Creating the Chicago Match System (59 F.R. 63141) SEC Release No. 34-35030, 1994 SEC LEXIS 3863, Nov. 30, 1994.

Self-Regulatory Organizations: Proposed Rule Change by the Cincinnati Stock Exchange Relating to Small Order Execution Guaranty, 1985 WL 547562; SEC Release No. 22330, Aug. 15, 1985.

Sodergreen, John, "Product profile: Economic Derivatives in the Energy Sector", Futures Industry Magazine, Jan.-Feb. 2005 issue, retrieved from http://www.futuresindustry/org/fi-magazine-home.asp?v=p&q=1018 on May 20, 2008.

Special Study: Payment for Order Flow and Internalization in the Options Markets, www.sec.gov/new/studies/ordpay.htm, printed on Oct. 19, 2001, 40 pages.

Sulima, Cheryl, "Volatility and Variance Swaps", Capital Markets News, Federal Reserve Bank of Chicago, Mar. 2001.

Transitions 1-3, Transitions Trading website, retrieved using: www.archive.org Jul. 29, 2004 and Dec. 11, 2004.

U.S. Appl. No. 11/849,835, filed Sep. 4, 2007, entitled "System and Method for Creating and Trading a Derivative Investment Instrument Over a Range of Index Values", Applicant: O'Connell et al.

U.S. Appl. No. 12/112,605, filed Apr. 30, 2008, entitled "System and Method for Creating and Trading a Derivative Investment Instrument Over a Range of Index Values", Applicant: O'Connell et al.

U.S. Appl. No. 12/267,013, filed Nov. 7, 2008, entitled "Method and System for Creating a Volatility Benchmark Index", Applicant: Catherine T. Shalen, Vasiliki D. Skintzi, "Implied correlation index: A new measure of diversification", The Journal of Future Markets, Feb. 2005, vol. 25, Iss. 2, pp. 1-3.

Whaley, Robert. "Return and Risk of CBOE Buy Write Monthly Index", *The Journal of Derivatives*, 2002, pp. 35-42.

\* cited by examiner

FIG. 6

| | | CUSTOMIZED BIN CALCULATOR — 60 | | |
|---|---|---|---|---|
| | TIER | CLASSES SELECTED | CLASSES/SEAT | WEIGHTED TOTAL — 66 |
| 62 — | A | 11 | 10 | 0.800 |
| | B | 5 | 15 | 0.333 |
| | C | 5 | 20 | 0.300 |
| | D | 6 | 25 | 0.200 |
| | E | 6 | 30 | 0.133 |
| | | | TOTAL SEATS REQUIRED: | 1.967 — 68 |
| | | | TOTAL SEATS OWNED: | 2.000 |
| | | | SELECTION ACCEPTABLE | |

Select classes below; 1 = selected, 0 or blank = not selected

| EXCHANGE REFERENCE | TIER | OPTION SYMBOL | UNDERLYING STOCK NAME — 76 | UNDERLYING SYMBOL | 1 = SELECTED CLASS — 82 | SEAT REQMT |
|---|---|---|---|---|---|---|
| 1 | A | HMY | Harmony Gold Mining | HMY | 1 | 0.100 — 84 |
| 2 | A | PEP | PepsiCo | PEP | 1 | 0.100 |
| 3 | A | CA | Computer Associates | CA | 1 | 0.100 |
| 4 | A | FON | Sprint | FON | 1 | 0.100 |
| 5 | A | GZQ | Genzyme | GENZ | 1 | 0.100 |
| 6 | A | HDI | Harley-Davidson | HDI | 1 | 0.100 |
| 7 | A | MOT | Motorola Inc. | MOT | 0 | |
| 8 | A | KKD | Krispy Kreme Donuts | KKD | 1 | 0.100 — 86 |
| 9 | A | SQX | Starbucks Corp. | SBUX | 1 | 0.100 0.800 |
| 100 | B | UQD | JDS Uniphase Corporation | JDSU | 1 | 0.067 |
| 101 | B | EUQ | Ciena Corporation, Inc. | CIEN | 1 | 0.067 |
| 102 | B | ALA | Alcatel | ALA | 1 | 0.067 |
| 103 | B | RRI | Reliant Resources, Inc. | RRI | 1 | 0.067 |
| 104 | B | AMD | Advanced Micro Devices, Inc. | AMD | 1 | 0.067 |
| 105 | B | BRQ | Bea Systems, Inc. | BEAS | 1 | 0.067 |
| 106 | B | MRK | Merck & Company, Inc. | MRK | 1 | 0.067 |
| 107 | B | RAD | Rite Aid Corporation | RAD | | |
| 108 | B | SYQ | Symantec Corporation | SYMC | | |
| 109 | B | CPN | Calpine Corporation | CPN | 1 | 0.067 |
| 200 | B | X | United States Steel Corporation | X | 1 | 0.067 |
| 201 | C | SLB | Schlumberger Ltd. | SLB | 1 | 0.050 0.533 |

TOTAL REQUEST / TIER A / TIER B / TIER C / TIER D / TIER E

MARKET PARTICIPANT ISSUE SELECTION SYSTEM AND METHOD

CROSS-REFERENCE TO RELATED APPLICATIONS

This application is a continuation of U.S. application Ser. No. 12/836,349, filed Jul. 14, 2010 now U.S. Pat. No. 8,209,255, which is a continuation of U.S. application Ser. No. 11/102,490, filed Apr. 7, 2005, now U.S. Pat. No. 7,809,629, wherein the entirety of each of these applications is hereby incorporated herein by reference.

FIELD OF THE INVENTION

The present invention relates to the trading of financial instruments, such as options or futures. More particularly, the present invention relates to a trading facility, such as an exchange, and method for allocating to market participants, such as market makers, the right to quote for particular issues on an exchange.

BACKGROUND

Traditional market making activity, on an exchange that trades financial instruments, involves a market maker providing liquidity to a market, for example through streaming quotes for both a bid and an offer at a particular price. In return for the right to stream quotes, the market maker is often required by the exchange to quote in certain maximum bid/offer spreads, maintain a minimum number of active quotes or engage in other functions deemed necessary by the exchange to maintain a fair and orderly market. In an open outcry exchange, market maker status is typically attained through an application process mandated by an exchange in which the right to act as a market maker for instruments traded at a specific location, or pit, on a trading floor is requested by a party who is a member of the exchange. With the advent of all-electronic, and combined electronic and open outcry trading, market making may now take place in an entirely electronic virtual trading crowd remotely from a trading floor. Accordingly, there is a need for a more flexible market maker issue selection process that is not limited to grouping issues available for quoting by market makers to those traded in predefined pits or locations on a trading floor.

BRIEF SUMMARY

In order to address the challenges in arranging for market makers to request quoting rights, and to provide for more flexibility for both market makers and an exchange in negotiating these rights, a system and method for allocation of these rights is described. According to a first aspect of the invention, a method is described where each of the issues available for trading on a trading facility is ranked based on a trading parameter associated with each issue and a selection value is assigned each available issue corresponding to the ranking. Upon receipt of a request for quoting rights in a subset of the available issues, the request is filtered based on the cumulative selection value. If the cumulative selection value is within an ownership requirement, such as a seat ownership requirement, set by the trading facility, the trading facility will authorize the market participant, for example a remote market maker, to access the exchange to stream quotes for the selected issues.

According to another aspect of the invention, an issue allocation system for determining which market participants for a trading facility are authorized to disseminate quotes on the trading facility for a particular issue includes an issue selection database having a listing of issues available for trading on the trading facility, wherein each issue is associated with a ranking based on a trading parameter associated with the issue. An issue selection communication module is in communication with the issue selection database. The issue selection communication module is configured to transmit the listing of available issues and the ranking associated with each issue in response to an issue selection query from a prospective market participant, such as a remote market maker. The system also includes an issue allocation filter in communication with the issue selection database. The issue allocation filter is responsive to receipt of an allocation request from a prospective market participant to compare a list of issues in the allocation request to a cumulative allocation value of issues identified in the allocation request, where the cumulative allocation value is based on the ranking of each issue provided in the allocation request.

BRIEF DESCRIPTION OF THE DRAWINGS

FIG. 6 illustrates an issue selection spreadsheet interface suitable for use in the system of FIGS. 1-3.

DETAILED DESCRIPTION OF THE DRAWINGS AND THF PRESENTLY PREFERRED EMBODIMENTS

A system and method for allocating to market makers the right to quote for particular issues, such as classes of securities options, on an exchange is described herein. For purposes of this specification, the following definitions will be used:

Market maker (MM)=professional trader, or organization, registered to trade at the exchange and required to provide liquidity to a market, for example through streaming quotes for both a bid and an offer at a particular price.

Remote market maker (RMM)=market maker approved by the exchange to submit quotes and orders from a location other than the physical trading station for the subject class of option (i.e., from off the floor of the exchange).

Designated primary market maker (DPM)=market maker designated by the exchange to be responsible for a fair and orderly market, and to provide continuous quotes, for a particular class of options.

Electronic DPM (eDPM)=is a member organization that is approved by the exchange to, remotely from off the floor of the exchange, function in allocated option classes as a DPM and to fulfill certain obligations required of DPMs except for floor broker and order book official obligations.

Floor broker=individual who represents orders from others in a trading crowd on the floor of an exchange.

Issue or Class of options=all series of options related to a given underlying asset or instrument, where the underlying asset or instrument may be, for example, publicly traded stock of a company.

Figure 1:
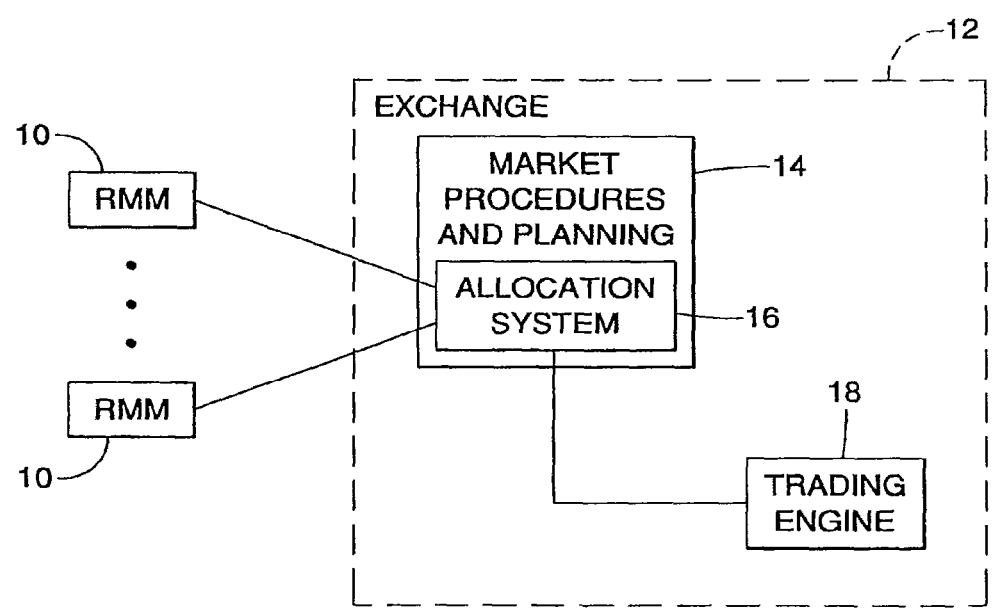
FIG. 1 is a block diagram of an exchange in communication with remote market makers.

In order to provide for an orderly market where various issues of securities are properly represented, and where market makers have access to a selection of desired issues for quoting based on exchange-based rules, a method and system for allocating issues among one or more types of market participants, such as remote market makers, is disclosed herein. Referring to FIG. 1, in one embodiment remote market makers (RMM) 10 communicate with an exchange 12 to arrange for quoting privileges in various issues traded at the exchange 12. The RMMs 10 each communicate via their own communication platform. For example, one or more RMMs 10 may use stand-alone personal computers, networked devices, wireless connections, PDAs or other known communication mechanisms to communicate with the exchange 12. RMM requests for issue allocation may also be done in person with market procedures and planning (MPP) staff of the exchange.

A market procedures and planning (MPP) group 14 associated with the exchange 12 may communicate with the RMMs 10 to arrange RMM appointments by crowd or customized appointments to specific issues. The MPP may include an allocation system 16, which may include a server or other device having a processor, memory and communication mechanism. The MPP 14 preferably maintains current lists of issues traded on the exchange, as well as the rules and requirements for allocating quoting rights to RMMs 10 or others authorized by the exchange. The MPP 14 may communicate with both the RMMs 10 and a trading engine 18 for the exchange.

Figure 2:
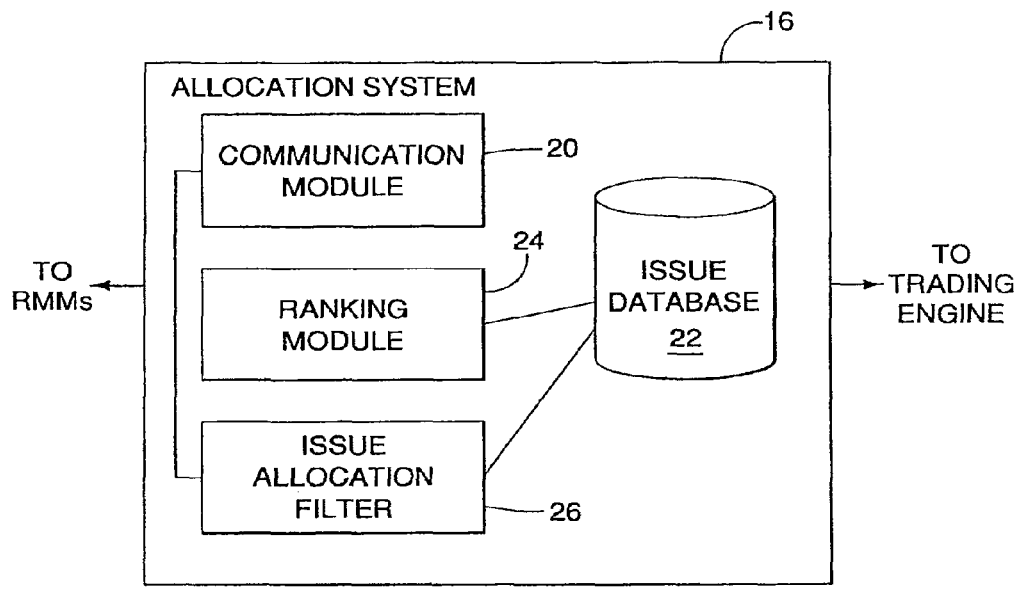
FIG. 2 is a block diagram of an embodiment of an issue allocation system suitable for use in the exchange of FIG. 1.

Referring to FIG. 2, the allocation system 16 may have a communication module 20, such as a modem, an issue database 22, a ranking module 24 and an issue allocation filter 26. The issue database 22 contains a listing of issues traded on the exchange. Within the allocation system 16, the issue database 22 is maintained in a memory with a ranked listing of issues traded on the exchange, for example classes of options. The allocation system 16 may be a stand-alone or distributed computer system. Additionally, the methods described below may be software instructions executable by the allocation system and stored in a computer readable form in, or accessible by, the allocation system on any of a number of known computer readable media. As described in detail below, RMMs may select a customized grouping, also referred to as configurable or virtual bins, of issues from this ranked listing in which to stream quotes from locations outside the exchange. In other embodiments, the system and method described herein may be configured to allow one or more other types of market participants, for example MMs, DPMs, or eDPMs, at an exchange or other type of trading facility to select their own virtual bins. Thus, in different embodiments, selection of virtual bins may be available to only one type of market participant, such as RMMs, or to any combination of types of market participants.

In one embodiment, the issue database includes a ranking of issues by a desired trading parameter. For example, the trading parameter may be national average daily volume of the issues for the previous three-month trading period. The issue database 22 may include information on each issue such as the option symbol, the underlying stock name and its associated stock symbol, internal system tracking identifiers and the ranking data. The ranking data reflects the perceived desirability of the issue in relation to the other available issues at the exchange. Accordingly, although one trading parameter for use in ranking the issues is noted above, any of a number of other trading parameters may be used to generate the ranking data. The ranking module 24 is preferably configured to receive the data relating to the chosen parameter for gauging desirability of the issues and calculate a ranking of the issues in the issue database. The ranking module 24 may be a software routine accessible by, or embedded in, a processor in the allocation system 16.

The issue allocation filter 26 applies exchange rules for granting quoting rights to RMMs. The allocation filter 26 receives requests from RMMs for specific groups of issue selections and verifies that the issue selection is acceptable to the exchange based on criteria including the value of the selected issues and the ownership interest of the RMM in the exchange, for example amount of shares of stock in the exchange owned, or the number of exchange seats owned or leased, by the RMM. Additional rules and limitations may also be applied to the RMM requests. The allocation filter 26 may communicate with the issue database for ranking information and may include or have access to an RMM database containing the RMM acronym registered with the exchange and the current seat ownership or leasehold data for that RMM. The issue allocation system 16 communicates with RMMs 10 and the trade engine 18 via its communication module 20.

Figure 3:
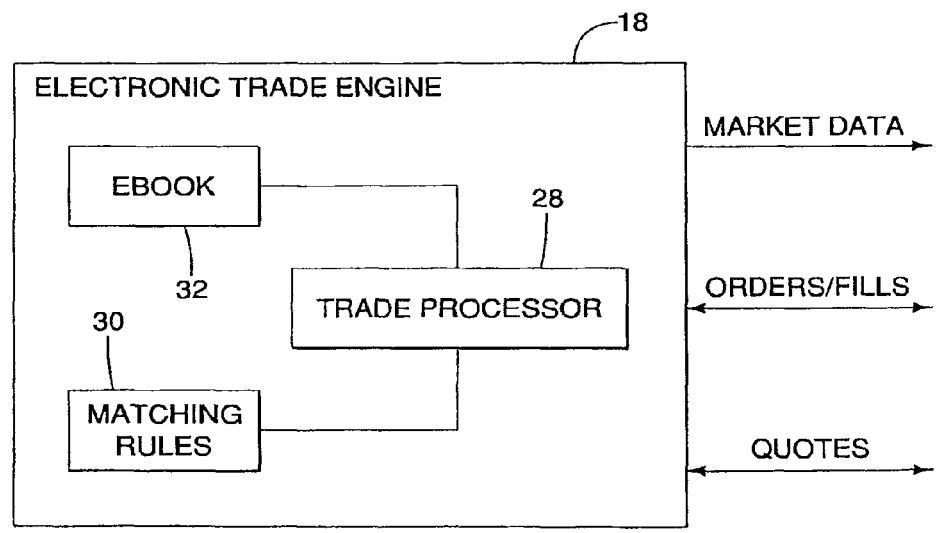
FIG. 3 is a block diagram of a trade engine suitable for use in the exchange of FIG. 1.

As illustrated in FIG. 3, the electronic trade engine 18 contains a trade processor 28 that analyzes and manipulates orders according to matching rules 30 stored in the database in communication with the trade processor. Also included in the electronic trade engine is the electronic book (EBOOK) 32 of orders and quotes with which incoming orders to buy or sell are matched with quotes and orders resting on the EBOOK 32 according to the matching rules 30. As with the allocation system 16, the electronic trade engine 18 may be a stand-alone or distributed computer system. Any of a number of hardware and software combinations configured to execute the trading methods described below may be used for the electronic trade engine 18. In one embodiment, the electronic trade engine 18 may be a server cluster consisting of servers available from Sun Microsystems, Inc., Fujitsu Ltd. or other known computer equipment manufacturers. The EBOOK 32 portion of the electronic trade engine 18 may be implemented with Oracle database software and may reside on one or more of the servers comprising the electronic trade engine 18. The rules database 30 may be C++ or Java-based programming accessible by, or executable by, the trade processor 28.

Figure 4:
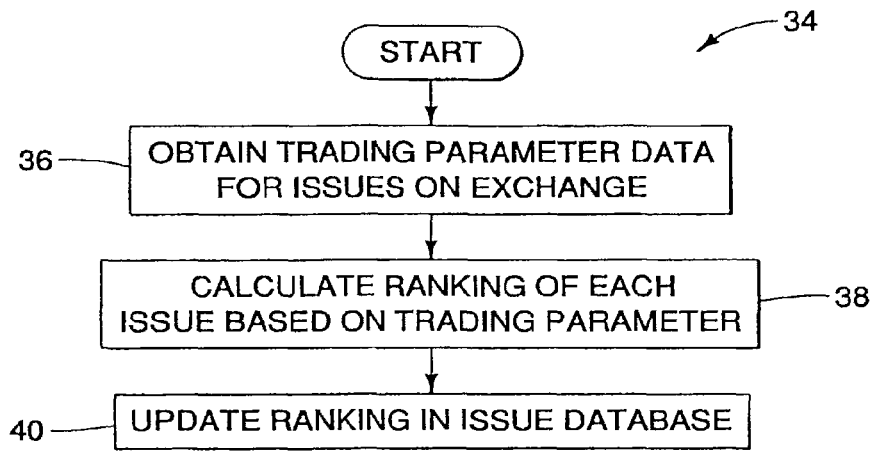
FIG. 4 is a flow diagram of an issue ranking and updating process.

Referring to FIG. 4, an issue ranking and updating process 34 using the system of FIGS. 1-3 is shown. Trading parameter data is gathered by the ranking module for issues traded on the exchange (at step 36). The trading parameter data may be automatically retrieved in electronic format, or manually entered, from an objective source for that trading parameter data. In the embodiment discussed above, where national average daily volume is used to generate rankings, the ranking module 24 may be configured to receive daily national trading volume from a source such as the Options Clearing Corporation (OCC). The ranking module 24 stores the trading parameter data in memory and calculates a ranking for each issue based on the trading parameter data (at step 38). In one embodiment, the ranking module 24 may collect the trading parameter data and periodically generate an average of the data. For example, in one embodiment the ranking module may collect data over a three month period and perform an averaging calculation. Various other trading parameters, or combinations of trading parameters, may be obtained and averaged by the ranking module. For example, objective criteria such as market capitalization or price variance of underlying stock (if the issues are equity options) may be used.

Once the trade parameter data has been averaged the data may then be applied to the information in the issue database to update rankings for the issues (at step 40). In one embodiment, each issue in the issue database may be provided ranking information by the ranking module. The ranking module may provide individual rankings, group a certain number of issues having a ranking within a desired range into separate tiers, or apply any number of other ranking criteria. In another embodiment where individual issue rankings are used to generate tiers of issues, the tiers may be determined by simply dividing the total number of issues into tiers having equal numbers of issues. In this example, if there were 5 tiers and 600 issues, each tier would be assigned 120 issues with the first or "A" tier receiving the 120 highest ranked issues, the second or "B" tier assigned the next 120 highest ranked issues, and so on. Alternatively, the tiers may contain uneven numbers of issues, or even different types of issues. For example, if the issues include equity options and index options, the index options may be placed in a separate tier from the equity options regardless of rank.

Figure 5:
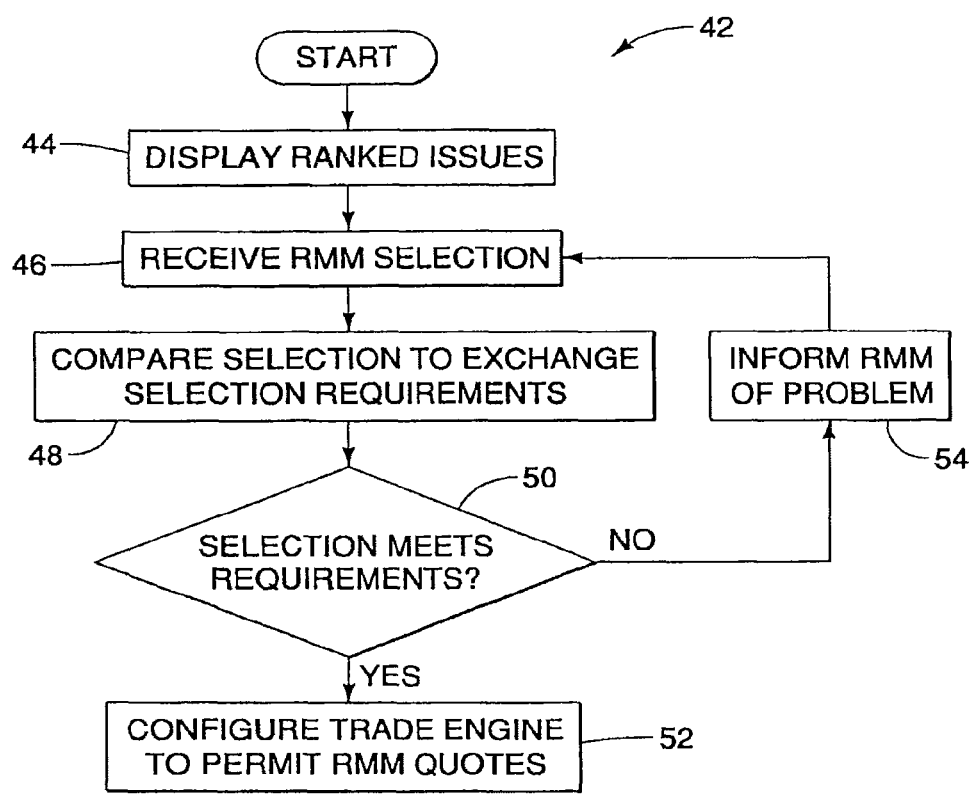
FIG. 5 is a flow diagram of a process of authorizing issue selection requests using the system of FIGS. 1-3.

Using the ranked and tiered issues listed in the issue database, a method 42 of enabling RMMs 10 to select issues, or rearrange previously selected issues, for streaming quotes is illustrated in FIG. 5. A list of issues on the exchange is provided to the RMM showing the tier, or other, ranking (at step 44). The RMM may then select a desired number of issues (at step 46). When the RMM has selected its desired issues and submitted the selection to the allocation system 16, the allocation system checks the selections against exchange requirements, such as seat ownership, where the current seat holdings for the RMM and the current values of the selected issues are compared (at step 48). The value, in one embodiment may be a tier value for the tier in which the selected issue is included. The tier value may be stored in terms of a fractional seat requirement. Thus, in one embodiment, each tier "A" issue selected may be valued at, for example, 0.1 seat so that the selection of 10 tier A issues would require that the RMM own or lease at least 1 seat. One example of seat requirements is illustrated in Table 1 below, where issues from a particular tier are given a value (multiplier).

TABLE 1

| Tier | Seat Requirement | Multiplier |
|---|---|---|
| Tier A | 1 seat for 10 classes | 1/10 or .1 |
| Tier B | 1 seat for 15 classes | 1/15 or .066 |
| Tier C | 1 seat for 20 classes | 1/20 or .05 |
| Tier D | 1 seat for 25 classes | 1/25 or .04 |
| Tier E | 1 seat for 30 classes | 1/30 or .033 |

Using the issue value chart of Table 1, an example of an acceptable remote market maker selection for a remote market maker owning one seat on the exchange is illustrated in Table 2.

TABLE 2

| Tier | Classes Selected | Classes/Seat | Weighted Total |
|---|---|---|---|
| A | 4 | 10 | 0.400 |
| B | 3 | 15 | 0.200 |
| C | 2 | 20 | 0.100 |
| D | 3 | 25 | 0.120 |
| E | 3 | 30 | 0.100 |
| TOTAL SEATS REQUIRED: | | | 0.920 |

Although the minimum seat requirement is preferably ownership of a whole number of seats greater than or equal to the sum of the selected issue values, in other embodiments it is contemplated that fractional seat ownership rights may be used to acquire quoting rights in issues adding to less than or equal to the fractional ownership of the RMM.

Assuming that the RMM's issue selections meet the minimum seat requirement, the issue allocation filter may then apply any additional exchange rules to the request. In one embodiment, the exchange may also filter the RMM selection requests by limiting the number of RMMs who are able to quote on a particular issue. The issue allocation filter may maintain a database of how many RMMs have been approved for quoting on each issue and deny a request from another RMM to quote in that same issue if the limit has been reached. These limits, also referred to as class quoting limits (CQL), may be applied in a number of ways. If the exchange is an all-electronic exchange, the limit may only be applied to RMMs. If the exchange is a hybrid electronic and open outcry exchange, the limit may be applied to how many total entities, such as the sum of RMMs, MMs, DPMs, eDPMs and any other market participants who can quote on the exchange, are already approved to quote in those specific issues.

The limits on number of quoters per issue may be set according to how the exchange believes it may best attract RMMs to use the exchange. In one embodiment, each tier may allow the same maximum number of RMMs per issue. In an alternative embodiment, the maximum number of RMMs per issue may be higher in the more popular, high value tiers and lower in the lower ranked tiers so that the greater exclusivity might attract RMMs to select lower tiers. In yet other alternative embodiments, the CQL may be staggered in the same manner as the tier structure. For example, while tier A value issues may be the first 120, or 20%, of an available 600 issues, the CQL may be set such that the 50 highest ranked issues have a limit of 40 quoters per issue, the next 100 highest ranked issues are allowed 35 quoters per issue, and so on. Also, just as the value for issues can be based on tiers or individual issue rankings, the CQL may also differ by issue rather than by group of issues.

If the issue allocation system 16 determines (at step 50) that the RMM selections meet the exchange requirements, the issue allocation system may then communicate the approval to the trade engine such that the trade engine will permit quotes in the selected issues arriving from the RMM to be disseminated to the exchange (at step 52). The issue allocation system also communicates with the RMM to verify acceptance of the RMM issue selection. If the issue allocation system 16 determines that one or more exchange requirements have not been met, then the RMM will be informed of the problem and given an opportunity to submit another request (at step 54).

In order to provide information to RMMs and obtain the RMM issue selection requests, the issue selection system provides access to a listing of issues and a value calculator to guide RMMs regarding the seat requirements for different configurations of RMM virtual bins. The communications between the issue allocation system and the RMMs may be in person with MPP staff or by facsimile, an email, or via an interface or interactive website. In one embodiment, an RMM may request and obtain an issue selection spreadsheet from the exchange. An example of an issue selection spreadsheet 56 is shown in FIG. 6. The current status section provides a list of selected issues 58. The spreadsheet 56 may be in the form of a static spreadsheet or an electronic spreadsheet, such as a Microsoft Excel spreadsheet. The issue selection spreadsheet may have a calculator 60 identifying issue tiers 62, the number of selected classes 64 in a particular tier, the weighting per class for a tier 66 and the weighted total 68.

In one embodiment, as shown in FIG. 6, the spreadsheet may include individual tabbed pages 70 containing a complete listing of all issues, by tier, available for selection by remote market makers on the exchange in addition to a selected issue tab 58. Tabbed pages may include a listing of all available issues for a particular tier. As shown in the total request tab, issues may be listed including an exchange reference code 72, tier identifier 74, underlying stock name 76, underlying stock symbol 78 and option symbol 80. The RMM may select a tabbed page and indicate which issues it is interested in including into its bin by entering a selection in a selection space 82 corresponding to the desired issue. The bin calculator 60 automatically updates the selected classes 64 column for the appropriate tier and recalculates the weighted total 66 column by multiplying the current number of classes selected for a tier by the seat requirement for issues in that tier. The calculated total seat requirement 68 also may automatically update by adding together the weighted total for each tier. In one embodiment, the calculator 60 remains persistently displayed regardless of which tab 70 is currently selected. The calculator is responsive to updates in the class selection space 82 on any of the tabbed pages of issue listings to update the seat calculations. The total request tab 58 may display seat requirement information 84 adjacent each selected issue, as well as displaying subtotal seat values 86 for each tier grouping.

Once an RMM has completed the issue selection spreadsheet, the spreadsheet may be transmitted to the issue selection server. In one embodiment, a printed out version of the spreadsheet may be transmitted via facsimile and entered by the MPP into the allocation server. In another embodiment, the spreadsheet may be maintained in electronic form and transmitted via email to the issue allocation server. In yet other embodiments, the exchange may allow access to an interactive website where RMMs may log in and manipulate an interface configured in the same manner as the issue selection spreadsheet to select desired issues. In one embodiment, where the spreadsheet of FIG. 6 is integrated as an interface of one or more windows in an exchange website, a submit button may be added to signal to the exchange that a completed selection has been made. Additionally, other criteria besides the seat ownership requirements may be updated in the website version so that if an issue selection is unavailable for reasons other than seat ownership, the RMM would be notified immediately or would not be presented with the selection option for that issue. Upon receipt of a completed issue selection spreadsheet or website selection from an RMM, the issue allocation filter 26 in the allocation system 16 will review the selections and automatically compare exchange rules to those selections as described previously.

If the requesting RMM lacks the requisite number of seats, the requesting RMM would receive notification from the MPP that an invalid selection has been attempted. If the issue selections and owned/leased seats are compatible, then the issue allocation filter 26 will proceed to the next exchange rule application. An example of another rule the issue allocation filter may apply is class quoting limitations. In one embodiment, an exchange may limit the number of members, including RMMs, quoting electronically in each class. The class quoting limits may be determined by tier and set forth in published rules accessible by RMMs.

In instances where an RMM is attempting to select a class already fully subscribed according to the class quoting limits for that tier, the issue allocation system 16 may store a waiting list of RMMs seeking to stream quotes in that particular issue on a first come first served basis, or some other basis as determined by the exchange. One alternative to the first come first served process may be to analyze past quoting performance for the RMM on the issue with the waiting list, or on all the RMM's issues generally. In this alternative procedure, RMMs with the best trading volume may be given priority in the waiting list. When the number of RMMs, or RMMs in combination with other market makers, quoting for an issue falls below the CQL, the allocation system would use the waiting list to send out automatic reminders to wait-listed RMMs to let them know that an issue is again open for selection and provide them a fixed period of time within which to accept before proceeding to automatic notification of the next waitlisted RMM. It is contemplated that issue selection may be made on a quarterly, monthly, or even daily basis to permit greater flexibility for RMM trading practices. Accordingly, openings for the rights to stream quotes in various issues may occur frequently and wait lists may be a viable option.

Separate from the selection frequency permitted to RMMs for reorganizing their bins of selected issues, the issue allocation system 16 may be configured to automatically re-rank and re-tier the available issues on a quarterly or other periodic basis. The re-tiering may be based on quarterly average total national daily volume information for issues traded at the exchange or any other objective criteria. Once the rebalanced tier system is calculated, the issue allocation system 16 may automatically notify RMMs, for example via email, if their seat ownership requirements are no longer met using their current bin of issues. The notification may include a grace period announcement and start a grace period timer in the issue allocation system for allowing the RMM to adjust its bin of issues to comply with the seat requirements. In one embodiment, a one month grace period may be permitted for RMMs to rebalance their customized bin selections according to the available seats they have. The issue allocation system may provide one or more reminders at specific calendar day increments, for example fourteen days before the end of the grace period, to remind RMMs of the need to rebalance.

After expiration of the rebalancing grace period, the issue allocation system may discipline non-compliant RMMs. In one embodiment, the issue allocation system may communicate instructions to the trade engine to deny the non-compliant RMM any access to stream quotes to the exchange. Alternatively, the issue allocation system may instruct the trading engine to deny quoting rights to enough randomly selected issues in the RMM's bin so that the RMM is in compliance with the seat requirement. Other variations of denying quoting access may also be implemented, such as analyzing RMM trading patterns to automatically deny non-compliant RMMs quoting rights on issues the RMM trades least, or that have the lowest tier value, until the RMM is in compliance.

Because the CQL of an issue may be tied directly to the rank or to the tier in which an issue resides, the periodic re-ranking and re-tiering may reduce or increase the total number of quoters permitted for that particular issue. In one embodiment, where a re-tiering operation moves an issue into a tier having a lower CQL, the issue allocation system may be configured to allow any market makers already permitted to stream quotes for the issue to retain the right to do so, given adequate seat ownership, even though there would be more remote market makers than the CQL would normally permit. Any market maker approved for an issue that is oversubscribed, however, would be cut off from reselecting that issue if the market maker relinquished the right for a period of time and then wanted to redesignate the oversubscribed issue at a later time. Conversely, if an issue moves in rank/tier to a higher CQL, the issue allocation system may communicate with wait-listed market makers to indicate availability of the issue.

Although the above description describes remote market making generally, it is contemplated that the issue allocation methods described above may apply to all-electronic exchanges where all market making is in virtual trading crowds (VTCs) as well as in hybrid trading exchanges where virtual trading crowds and live trading crowds (i.e. open-outcry trading on the floor of an exchange) take place. One example of a hybrid exchange is discussed in US 2004-0215538 A1, published Oct. 28, 2004, the entirety of which is incorporated herein by reference. Also, the embodiments of the system and method described above may be configured to apply only to selection of issues for remote market makers, or to apply to one or more other types of market participants whether remotely located or on the floor of the exchange.

It is intended that the foregoing detailed description be regarded as illustrative rather than limiting, and that it be understood that it is the following claims, including all equivalents, that are intended to define the scope of this invention.

We claim:

1. An option class selection system for authorizing market participants to disseminate quotes on a trading facility for at least one option class, the option class selection system comprising:

an option class selection database, the option class selection database comprising a listing of a plurality of option classes available for trading on the trading facility, wherein each option class is associated with a numeric value based on a trading parameter associated with the option class;

a communication module configured for communicating with a trade engine of an exchange; and a processor in communication with the trade engine and in communication with the option class selection database, the processor configured to:

receive a request to obtain rights to submit quotes in a subset of the plurality of available option classes from a market participant having a quoting privilege at the exchange, wherein the quoting privilege of the market participant is less than an amount necessary to obtain rights to submit quotes in all available option classes;

calculate a total of the numeric values associated with the option classes in the subset;

determine if the total of the numeric values is less than or equal to a value of the quoting privilege associated with the market participant; and authorize the market participant to submit quotes in the subset if the total of the numeric values is less than or equal to the value of the quoting privilege.

2. The option class selection system of claim 1, wherein the processor is further configured to:

revise the numeric value on a periodic basis.

3. The option class selection system of claim 2, wherein the periodic basis is quarterly.

4. The option class selection system of claim 1, wherein the trading parameter is based on a volume traded of the option class.

5. The option class selection system of claim 1, wherein the quoting privilege is calculated based on an ownership or current lease of exchange issued rights.

6. The option class selection system of claim 1, wherein the exchange comprises an all-electronic exchange.

7. The option class selection system of claim 1, wherein authorizing the market participant to submit quotes comprises communicating an authorization message to the trade engine, the authorization message comprising information identifying the market participant and information identifying option classes in the subset of the plurality of option classes.

8. The option class selection system of claim 1, wherein the trading parameter comprises a price variance of an underlying asset of the option class.

9. The option class selection system of claim 1, wherein the processor is further configured to transmit available option classes for display, and receive the request to obtain rights, over an electronic interface.

10. The option class selection system of claim 9, wherein the electronic interface comprises a website.

11. A computer-implemented method for authorizing market participants to disseminate quotes on a trading facility for a particular option class, the method comprising:

in an option class selection system having an option class selection database of a plurality of option classes available for trading, a communication module configured for communicating with a trade engine of an exchange and a computer processor in communication with the trade engine the option class selection database, the computer processor:

receiving a request to obtain rights to submit quotes in a subset of the plurality of available option classes from a market participant having a quoting privilege at the exchange, wherein the quoting privilege of the market participant is less than an amount necessary to obtain rights to submit quotes in all available option classes;

calculating a total of numeric values in the option class selection database associated with the option classes in the subset, wherein each numeric value is based on a trading parameter associated with the option class;

determining if the total of the numeric values is less than or equal to a value of the quoting privilege associated with the market participant; and authorizing the market participant to submit quotes in the subset if the total of the numeric values is less than or equal to the value of the quoting privilege.

12. The computer-implemented method of claim 11, further comprising the computer processor revising the numeric values on a periodic basis.

13. The computer-implemented method of claim 12, wherein the periodic basis is quarterly.

14. The computer-implemented method of claim 11, wherein the trading parameter is based on a volume traded of the option class.

15. The computer-implemented method of claim 11, wherein calculating the quoting privilege comprises calculating the quoting privilege based on an ownership or current lease of exchange issued rights of the market participant.

16. The computer-implemented method of claim 11, wherein the exchange comprises an all-electronic exchange.

17. The computer-implemented method of claim 11, wherein authorizing the market participant to submit quotes comprises communicating an authorization message to the trade engine, the authorization message comprising information identifying the market participant and information identifying option classes in the subset of the plurality of option classes.

18. The computer-implemented method of claim 11, wherein the trading parameter comprises a price variance of an underlying asset of the option class.

19. The computer-implemented method of claim 11, further comprising the transmitting available option classes for display, and receiving the request to obtain rights, over an electronic interface.

20. The computer-implemented method of claim 19, wherein the electronic interface comprises a website.

* * * * *